US012710179B2

(12) United States Patent
Panjer

(10) Patent No.: US 12,710,179 B2
(45) Date of Patent: Aug. 18, 2026

(54) AUTOMATIC PRIMARY LATCH MECHANISM

(71) Applicant: B/E Aerospace, Inc., Winston Salem, NC (US)

(72) Inventor: Frederik Adrian Stephan Panjer, Maarsbergen (NL)

(73) Assignee: B/E AEROSPACE, INC, Winston Salem, NC (US)

( * ) Notice: Subject to any disclaimer, the term of this patent is extended or adjusted under 35 U.S.C. 154(b) by 364 days.

(21) Appl. No.: 18/469,713

(22) Filed: Sep. 19, 2023

(65) Prior Publication Data

US 2024/0167692 A1 May 23, 2024

(30) Foreign Application Priority Data

Nov. 18, 2022 (EP) .................................... 22208426

(51) Int. Cl.
*B64D 11/04* (2006.01)
*E05B 47/00* (2006.01)
(Continued)

(52) U.S. Cl.
CPC ............ *F24C 15/022* (2013.01); *B64D 11/04* (2013.01); *E05B 47/0012* (2013.01); *E05C 9/04* (2013.01);
(Continued)

(58) Field of Classification Search
CPC ... F24C 15/022; B64D 11/04; E05B 47/0012; E05B 2407/0017; E05B 2407/0054; E05B 2407/0068; E05B 2407/0069; E05C 9/04
(Continued)

(56) References Cited

U.S. PATENT DOCUMENTS 4,470,277 A * 9/1984 Uyeda ................. E05B 65/0075 70/284
5,487,289 A 1/1996 Otto, III et al.
(Continued)

FOREIGN PATENT DOCUMENTS

EP 3689746 8/2020
FR 2610977 8/1988

OTHER PUBLICATIONS

EPO, Extended European Search Report dated Apr. 11, 2023 with EP Serial No. 22208426.1.

*Primary Examiner* — Avinash A Savani
(74) *Attorney, Agent, or Firm* — SNELL & WILMER L.L.P.

(57) ABSTRACT

A system comprising a door assembly configured to be installed within an aircraft galley, the door assembly including: a door body which is moveable between a closed position and an open position; and a primary latch mechanism configured to secure the door body in the closed position. The primary latch mechanism is moveable between a latched position, a neutral position and an unlatched position. The primary latch mechanism includes: a rotatable plate, an electrically operated actuator mechanically coupled to the rotatable plate and configured to rotate the rotatable plate, a handle mechanically coupled to the rotatable plate and configured to rotate the rotatable plate, and a latching rod coupled to the rotatable plate, wherein the rotatable plate is configured to convert a rotational movement into linear movement of the latching rod such that the door assembly may be latched and unlatched.

11 Claims, 13 Drawing Sheets

(51) Int. Cl.
*E05C 9/04* (2006.01)
*F24C 15/02* (2006.01)

(52) U.S. Cl.
CPC ................. *E05B 2047/0017* (2013.01); *E05B 2047/0054* (2013.01); *E05B 2047/0068* (2013.01); *E05B 2047/0069* (2013.01)

(58) Field of Classification Search
USPC .......................................................... 126/276
See application file for complete search history.

(56) References Cited

U.S. PATENT DOCUMENTS

2009/0245981 A1* 10/2009 Miyajima ......... H01L 21/67373 220/377
2019/0210730 A1 7/2019 Riedel et al.
2019/0309548 A1 10/2019 LaConte
2021/0285268 A1 9/2021 Panjer

* cited by examiner

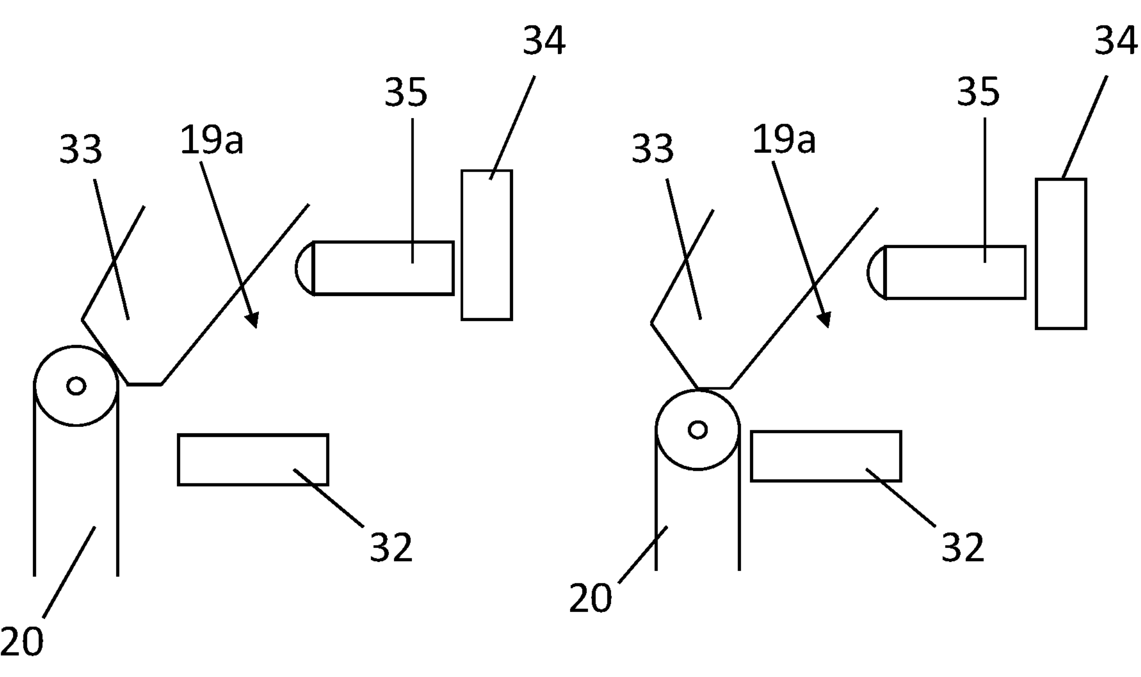
Fig. 11a
Fig. 11b
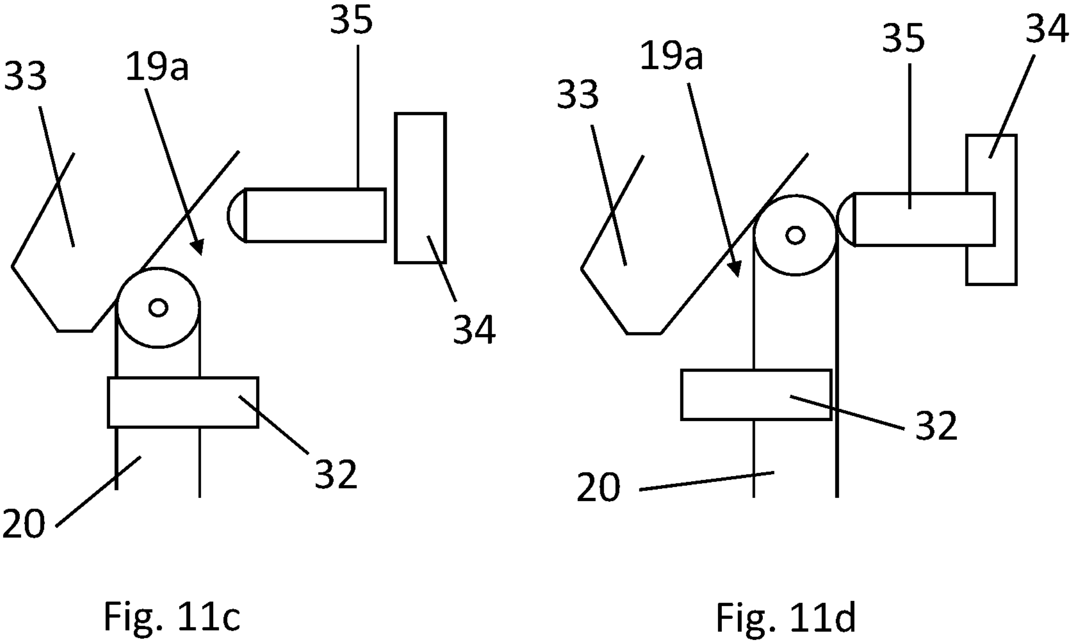
Fig. 11c
Fig. 11d

AUTOMATIC PRIMARY LATCH MECHANISM

CROSS-REFERENCE TO RELATED APPLICATIONS

This application claims priority to, and the benefit of, EP Patent Application No. 22208426.1, filed Nov. 18, 2022 and titled "AUTOMATIC PRIMARY LATCH MECHANISM," which is incorporated by reference herein in its entirety for all purposes.

FIELD

This disclosure relates to a system comprising a door assembly configured to be installed within an aircraft galley.

BACKGROUND

Door latches for aircraft galley insert doors currently are manually latched. Crew members currently spend significant time latching doors, for example when starting a cooking program on an aircraft galley oven, or latching doors during taxi, take-off, turbulence and landing for safety reasons.

Although automatically latching aircraft galley insert doors have been envisaged in US 2021/0285268, these prior art designs use a separate (secondary) latch which is automatically actuated. This secondary latch is provided as a back-up, in order to meet safety requirements, but is not the latching mechanism which is primarily used to latch and unlatch doors via user input, for example when a flight attendant needs to open and close an aircraft galley oven door in order to use it.

SUMMARY

According to this Disclosure, there is Provided a System Comprising:

- a door assembly configured to be installed within an aircraft galley, the door assembly comprising:
- a door body which is moveable between a closed position and an open position; and
- a primary latch mechanism configured to secure the door body in the closed position, wherein the primary latch mechanism is moveable between a latched position, a neutral position and
- an unlatched position, wherein the primary latch mechanism comprises:
- a rotatable plate;
- an electrically operated actuator mechanically coupled to the rotatable plate and configured to rotate the rotatable plate;
- a handle mechanically coupled to the rotatable plate and configured to rotate the rotatable plate; and
- a latching rod coupled to the rotatable plate,
  - wherein the rotatable plate is configured to convert a rotational movement into linear movement of the latching rod such that the door assembly may be latched and unlatched.

It will be understood that the door assembly is latched when the door body is in the closed position and the primary latch mechanism is in the latched position.

It will be understood that the latched position of the primary latch mechanism is a position in which the latching rod is fully extended (e.g. protruding out of the door body), and the unlatched position of the primary latch mechanism is a position in which the latching rod is fully retracted (e.g. fully retracted into the door body). When the primary latch mechanism (and hence the latching rod) is moved from the latched or unlatched state, the primary latch mechanism may automatically move to (e.g. be biased towards) the neutral position. In the neutral position, the latching rod may be arranged to retain the door body in the closed position, e.g. the latching rod may be arranged to protrude from the door body in the neutral position, just to a lesser degree than it does when the primary latch mechanism is in the latched position. The primary latch mechanism may have to be forced through the neutral position to the unlatched position in order to fully open the door. The purpose of the neutral state may be to prevent accidental opening of the door.

The electrically operated actuator may comprise any suitable and desired actuator. In embodiments, the electrically operated actuator comprises an electrical motor, e.g. a rotary motor arranged to rotate the actuator (e.g. so to rotate the rotatable plate).

In embodiments, the system comprises a sensor assembly configured to determine whether or not the door body is in the closed position (e.g. the door body is closed, but is not yet securely latched).

The sensor assembly may comprise any suitable sensor, or a combination of suitable sensors. For example, the sensor assembly may comprise one or more of an optical sensor, an electromechanical switch, a capacitive sensor, and an inductive sensor.

In embodiments, the system comprises a door frame configured to at least partially receive the door assembly, wherein the door frame defines one or more holes (e.g. indents, depressions) configured to (at least partially) receive the latching rod when the primary latch mechanism is in the latched position (to secure the door body in the closed position). It will be understood that the system may comprise a door frame as described and may not necessarily comprise a sensor assembly.

In embodiments at least a part of the sensor assembly is mounted in or proximal to one of the one or more holes, wherein the sensor assembly is configured to produce data indicative of a position of the latching rod relative to the hole.

In embodiments, the sensor assembly is configured to detect whether or not the latching rod is currently received in the latching hole. This information may be indicative of whether or not the door body is in the closed position and/or whether or not the door assembly is latched.

In embodiments, the system comprises a controller (e.g. one or more controllers). It will be understood that the role of the controller may in fact be implemented by a plurality of interconnected controllers or by one or more remote servers.

In embodiments, the controller is communicatively coupled to the sensor assembly and the actuator, wherein the controller is configured to control the actuator to rotate the rotatable plate such that the latching rod is moved to the latching position in response to receiving a signal from the sensor assembly that the door body is in the closed position.

In embodiments, the sensor assembly is configured to detect the position of the latching rod within the hole to determine if the primary latch mechanism is in the latched position or the neutral position.

In embodiments, the sensor assembly comprises a first sensor configured to detect the position of the latching rod relative to the hole, and a second sensor configured to detect the position of the latching rod within the hole.

In embodiments, the first sensor is mounted within the door. In embodiments, the second sensor is mounted within the door frame.

In embodiments, one or both of the first and second sensors are optical sensors.

In embodiments, the sensor assembly comprises a sensor pin which is configured to be pushed into the second sensor by the latching rod when the primary latch mechanism is in the latched position and the door is closed.

In embodiments the door assembly is configured to be fitted to an aircraft galley oven, and the controller is configured to allow the oven (e.g. send a signal to the oven) to begin a heating program (e.g. where a heating program has been requested via a user input on an oven control panel) only in response to receiving both a first signal from the sensor assembly (e.g. from the first sensor) indicating that the door body is in a closed position, and a second signal from the sensor assembly (e.g. from the second sensor) that the primary latch mechanism is in the latched position.

In embodiments the controller is configured to automatically control the oven to begin a heating program in response to receiving both a first signal from the sensor assembly indicating that the door body is in a closed position, and a second signal from the sensor assembly that the primary latch mechanism is in the latched position.

In embodiments, the primary latch mechanism comprises a compression spring (e.g. a coil spring), coaxially arranged on the latching rod, wherein the compression spring is configured to bias the primary latch mechanism into the neutral position. When the primary latch mechanism is in an unlatched position, the compression spring is compressed. When the primary latch mechanism is in the latched position, the compression spring is under tension.

In embodiments, the rotatable plate comprises a curved channel, wherein the latching rod comprises a roller bearing, the roller bearing being configured to travel in the curved channel when the rotatable plate is rotated.

In embodiments, the latching rod comprises a roller located at a tip of the latching rod (e.g. located at the end of the latching rod which is configured to be received by the latching hole). In such embodiments, friction may be reduced between the door frame and the latching rod such that the latching rod does not need to be fully retracted (corresponding to the unlatched position of the primary latch mechanism) in order for the door to be closed. If the door is pushed closed, the roller will contact the door frame, the latching rod will be pushed into a retracted position (e.g. against the biasing of the compression spring), and the latching rod will then re-extend once it is aligned with the latching hole.

In embodiments the latching rod is a first latching rod, and the primary latch mechanism comprises a second latching rod.

In embodiments, the second latching rod is configured to function in the same way as the first latching rod. For example, the second latching rod may comprise one, a plurality of, or all of the features which have been described in relation to the first latching rod, and may interact with the rotatable plate in the same way as has been described in relation to the first latching rod. As such, it will be understood that in embodiments where the primary latch mechanism comprises a second latching rod, the rotatable plate will be adapted to interact with both the first and second latching rods.

In embodiments, the system further comprises a secondary latch mechanism configured to further secure the door in the closed position such that the door is still secure in the event of a primary latch mechanism failure.

In embodiments, the system may be configured to communicate with an external controller such that the door can be remotely latched. For example, a computing device on an aircraft may be in communication with the controllers of a plurality of systems as described above (e.g. a plurality of galley inserts comprising latching doors) such that all of the doors on an aircraft can be automatically latched, for example during take-off and landing.

It will be appreciated that such an arrangement could allow remote latching of primary latch mechanisms of the door, or a plurality of such doors, if the controller detects (via the sensor assembly) that the door is not latched before vehicle departure, or in response to an input, for example from a crew member, such as a flight attendant. Further, when the system is installed in an aircraft galley, the controller could verify, via the sensor assembly, that the door is latched if turbulence is detected.

BRIEF DESCRIPTION OF THE DRAWINGS

One or more non-limiting examples will now be described, by way of example only, and with reference to the accompanying figures in which:

FIGS. 11*a-d* schematically show the operation of a sensor system;

DETAILED DESCRIPTION

The below described embodiments will be understood to be exemplary only. Further, although the below described embodiments are discussed in relation to an aircraft galley oven, it will be understood that the system of the present disclosure may be used on any suitable door assembly. In particular, the system may be used on any suitable galley door, for example, the galley doors of a coach or a train. It is envisaged that the novel concepts disclosed herein may be applied to systems independent of vehicle galley doors.

Figure 1:
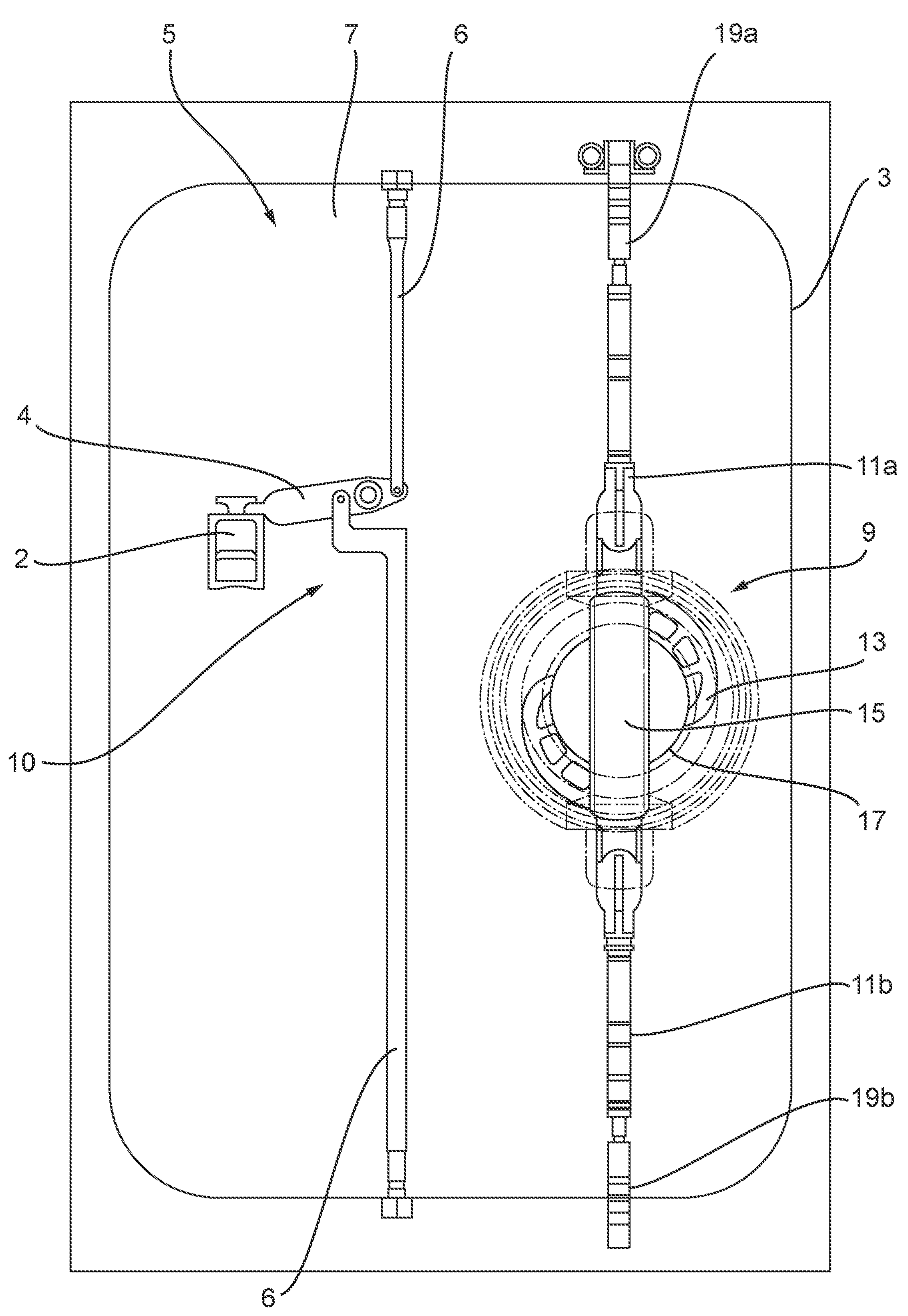
FIG. 1 shows a cutaway view of a galley oven door in accordance with an embodiment of the invention.

FIG. 1 shows a cutaway view of an aircraft galley oven door comprising a door frame 3 and door assembly 5. In the illustrated embodiment, the door frame 3 is part of an aircraft galley oven, such that the door assembly 5 is a galley oven door assembly. The door assembly 5 comprises a door body 7 and a primary latch mechanism 9 configured to secure the door body 7 to the door frame 3.

The door assembly 5 further comprises a secondary latch mechanism 10. The secondary latch mechanism 10 comprises a secondary latch sliding button 2, a lever 4 and two extension rods 6. The secondary latch mechanism may be manually operated by moving the secondary latch button 2 on the front of the door body 7, for example, by moving the secondary latch button 2 up to an unlatched position or down to a latched position, or vice versa.

Movement of the secondary latch sliding button 2 is transferred by the lever 4 to the extension rods 6 by the lever 4 pivoting around a rotation point. The extension rods 6 extend into or out of the door body 7, depending on the movement of the secondary latch button 2, and when extended, engage with the door frame 3 (e.g. with latching holes in the door frame (not shown)).

The primary latch mechanism 9 comprises a first latching rod 11*a*, a second latching rod 11*b*, a rotatable plate 13, a handle 15 and an electrically operated actuator 17. As can be seen in FIG. 1, the door frame 3 is configured to receive the door body 7. The door frame 3 defines first and second latching holes 19*a*, 19*b*, which are configured to receive the first and second latching rods 11*a*, 11*b*, when the door body 7 is latched to the door frame 3, to secure the door body 7 in place.

Figure 2:
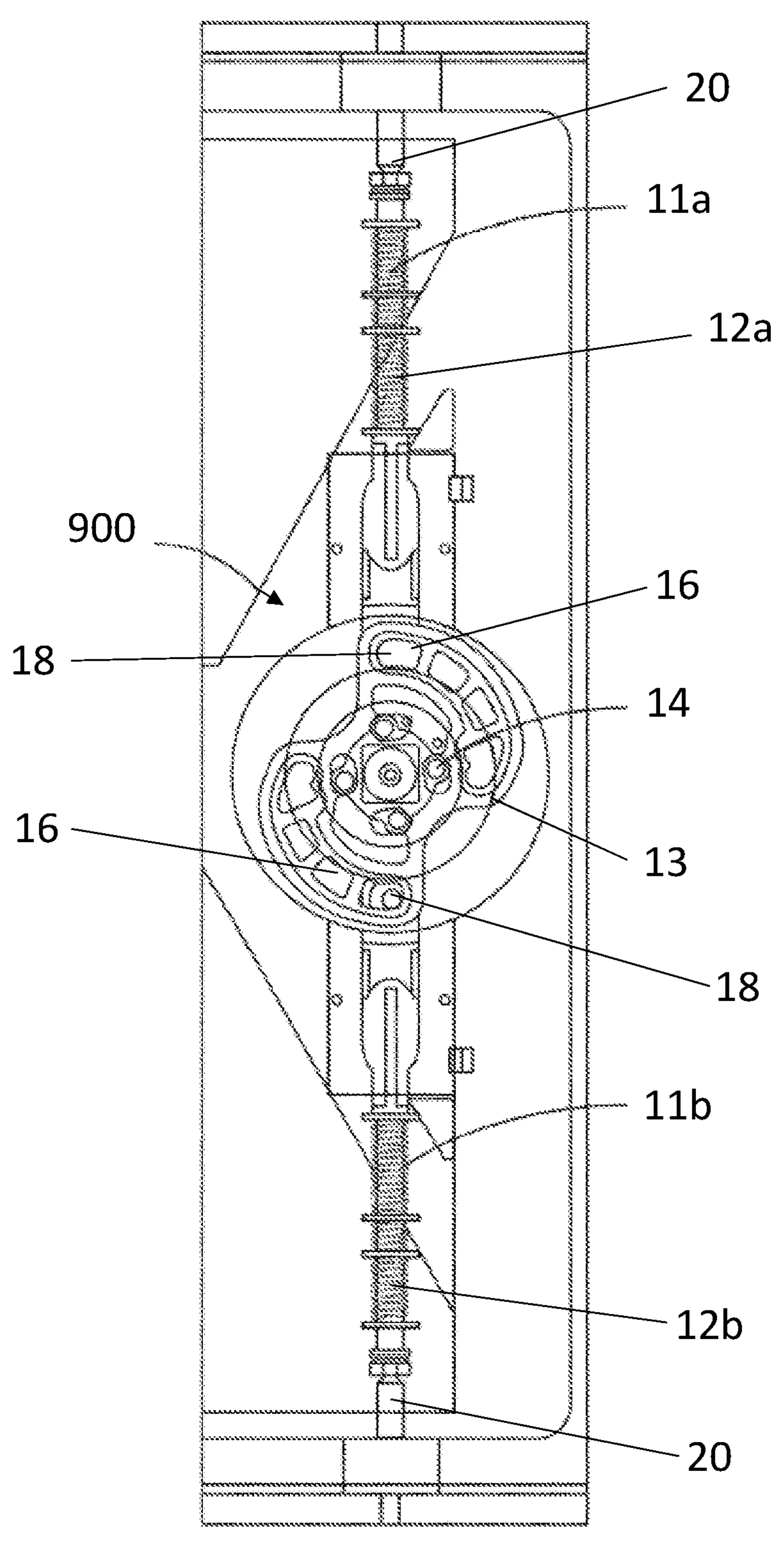
FIG. 2 shows a cutaway view of a prior art primary latch mechanism with the latching rods in the latched position.
Figure 3:
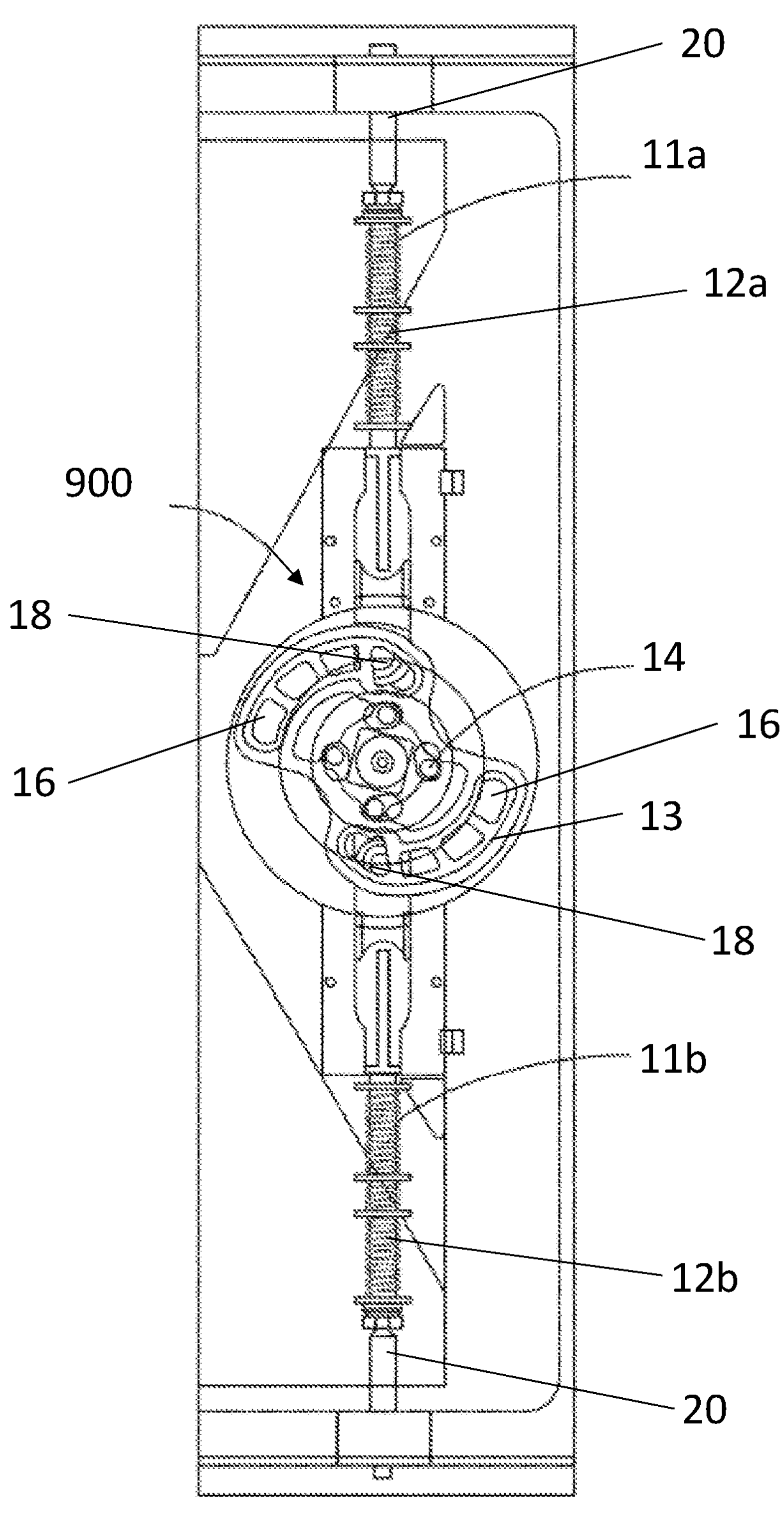
FIG. 3 shows a cutaway view of a prior art primary latch mechanism with the latching rods in the neutral position.
Figure 4:
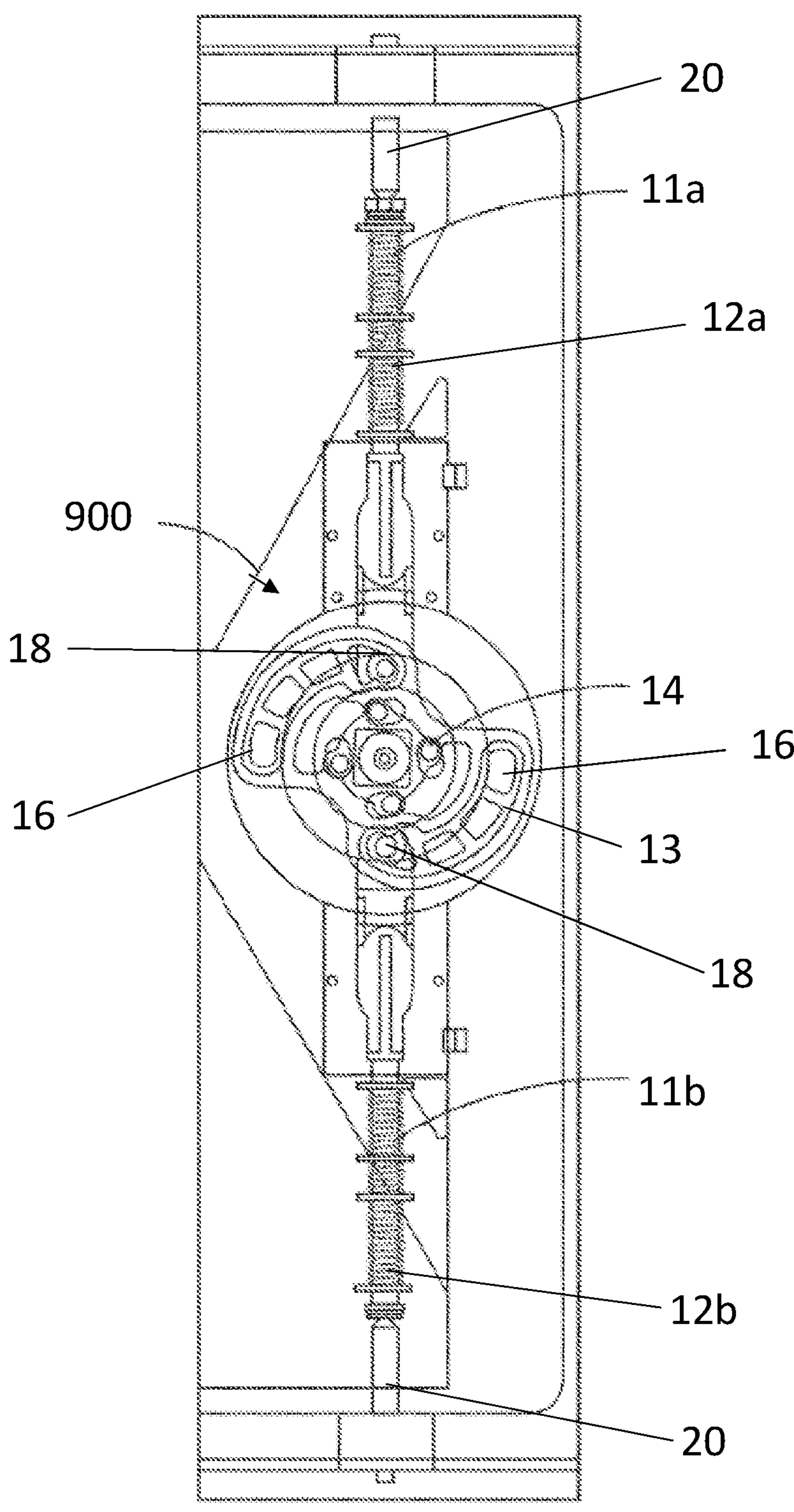
FIG. 4 shows a cutaway view of a prior art primary latch mechanism with the latching rods in the un-latched position.
Figure 5:
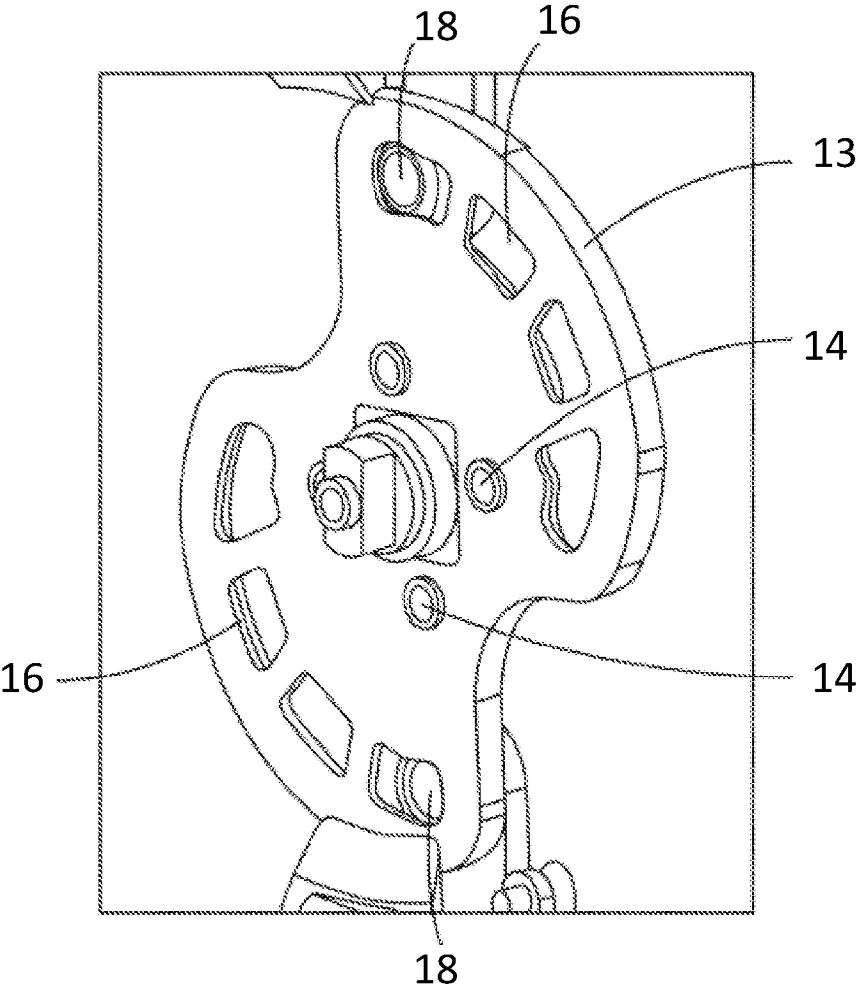
FIG. 5 shows a perspective view of a prior art rotatable plate.

FIGS. 2-7 show a prior art primary latch mechanism 900. FIG. 2 shows the primary latch mechanism 900 in a latched position. FIG. 3 shows the primary latch mechanism 900 in a neutral position. FIG. 4 shows the primary latch mechanism 900 in an unlatched position. The primary latch mechanism 900 includes a handle 15, a rotatable plate 13, first and second latching rods 11*a*, 11*b*, and first and second compression springs 12*a*, 12*b*.

The handle 15 is a lever that an operator actuates to move the primary latch mechanism 900. The handle 15 is mechanically connected to the rotatable plate 13.

The rotatable plate 13 is configured to convert a rotational movement of the handle 15 to linear movement of the latching rods 11*a*, 11*b*. The rotatable plate 13 may have any suitable shape, such as square, circular, or partially circular. The rotatable plate may have at least one (e.g. four) spring plunger 14 attached to the rotatable plate. The spring plungers 14 are configured to retain the primary latch mechanism 900 in a neutral or latched position when the primary latch mechanism 900 is not forced into the unlatched position. The rotatable plate 13 may have a pair of channels 16 (e.g. recessed channels) for engaging with bearings 18 of the latching rods 11*a*, 11*b* such that the bearings 18 move through the channels 16 when the handle 15 is rotated to move the primary latch mechanism 900 to a different position.

Figure 6:
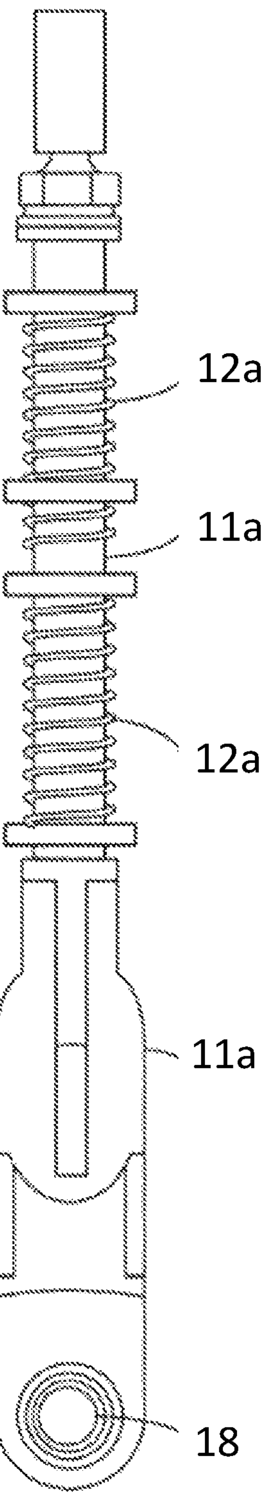
FIG. 6 shows a prior art latching rod.

Referring now to FIG. 6, the latching rods 11*a*, 11*b* extend between the end pieces 20 and the rotatable plate 13. The latching rods 11*a*, 11*b* are connected to the end pieces 20 and engage with the channels 16 of the rotatable plate 13. The latching rods 11*a*, 11*b* include roller bearings 18 which move through the channels 16 when the handle 15 is rotated to move the primary latch mechanism 900 to a different position. The roller bearings 18 may reduce friction during the transfer of energy from the rotational movement of the rotatable plate 13 to linear movement of the latching rods 11*a*, 11*b*.

As can be seen in FIG. 6, the first latching rod 11*a* extends through the first compression spring 12*a*. It will be understood that the arrangement of the second latching rod 11*b* and second compression spring 12*b* is exactly the same. The compression springs 12*a*, 12*b* are configured to maintain the neutral position of the primary latch mechanism 900 by accumulating energy when the primary latch mechanism 900 is placed in the unlatched or latched state and by returning that energy when the primary latch mechanism 900 is reversed.

Figure 7:
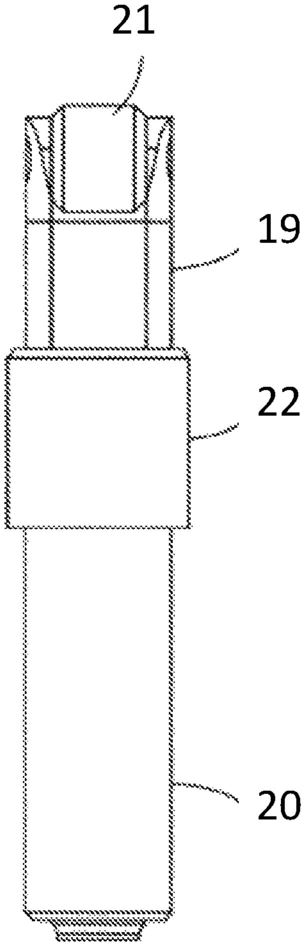
FIG. 7 shows a close up view of the end piece of the latching rod of FIG. 6.

Referring now to FIG. 7, the end pieces 20 are configured to extend out of the door assembly 5 and to be received by the door frame 3. A tip of each end piece 20 comprises a roller 21 mounted to the end piece 20 to reduce friction when the end piece 20 is extended into the door frame 3. The linear movement of the end pieces 20 is guided by slide bearings 22.

Figure 8:
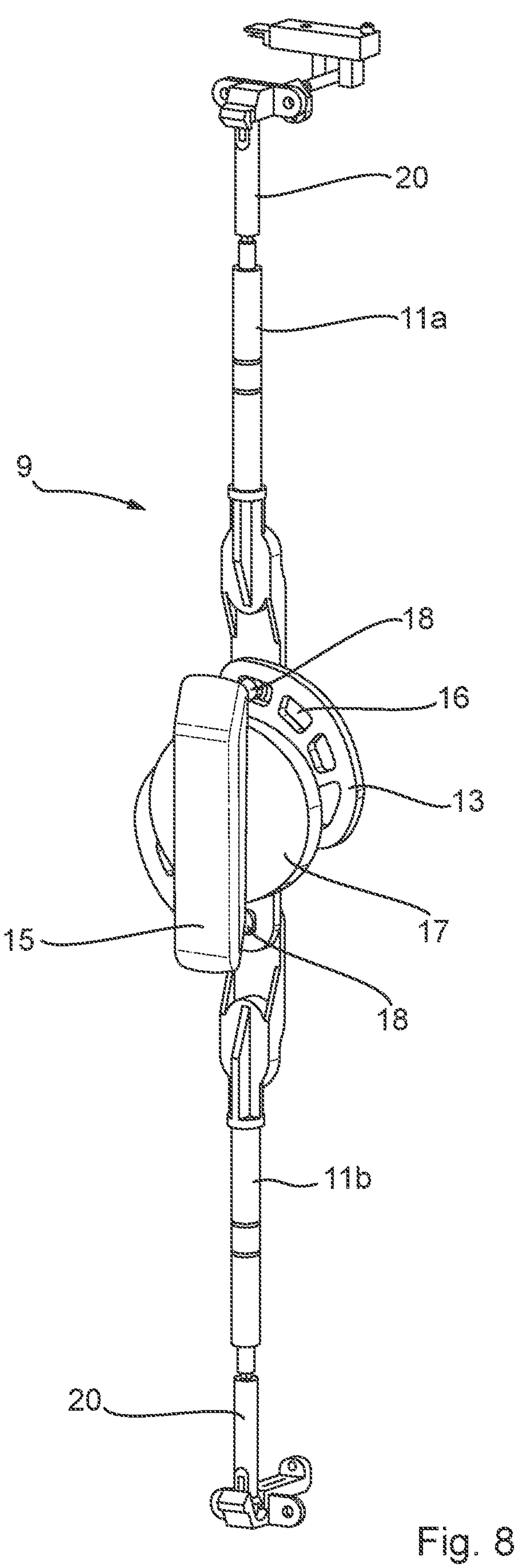
FIG. 8 shows a perspective view of a latch mechanism in accordance with an embodiment of the present invention.

FIG. 8 shows a perspective view of a primary latch mechanism 9 according to an embodiment of the present invention. Except where stated otherwise, it will be understood that the construction and function of the primary latch mechanism 9 is the same as the construction and function of the prior art primary latch mechanism 900 discussed above in relation to FIGS. 2-7.

Figure 9:
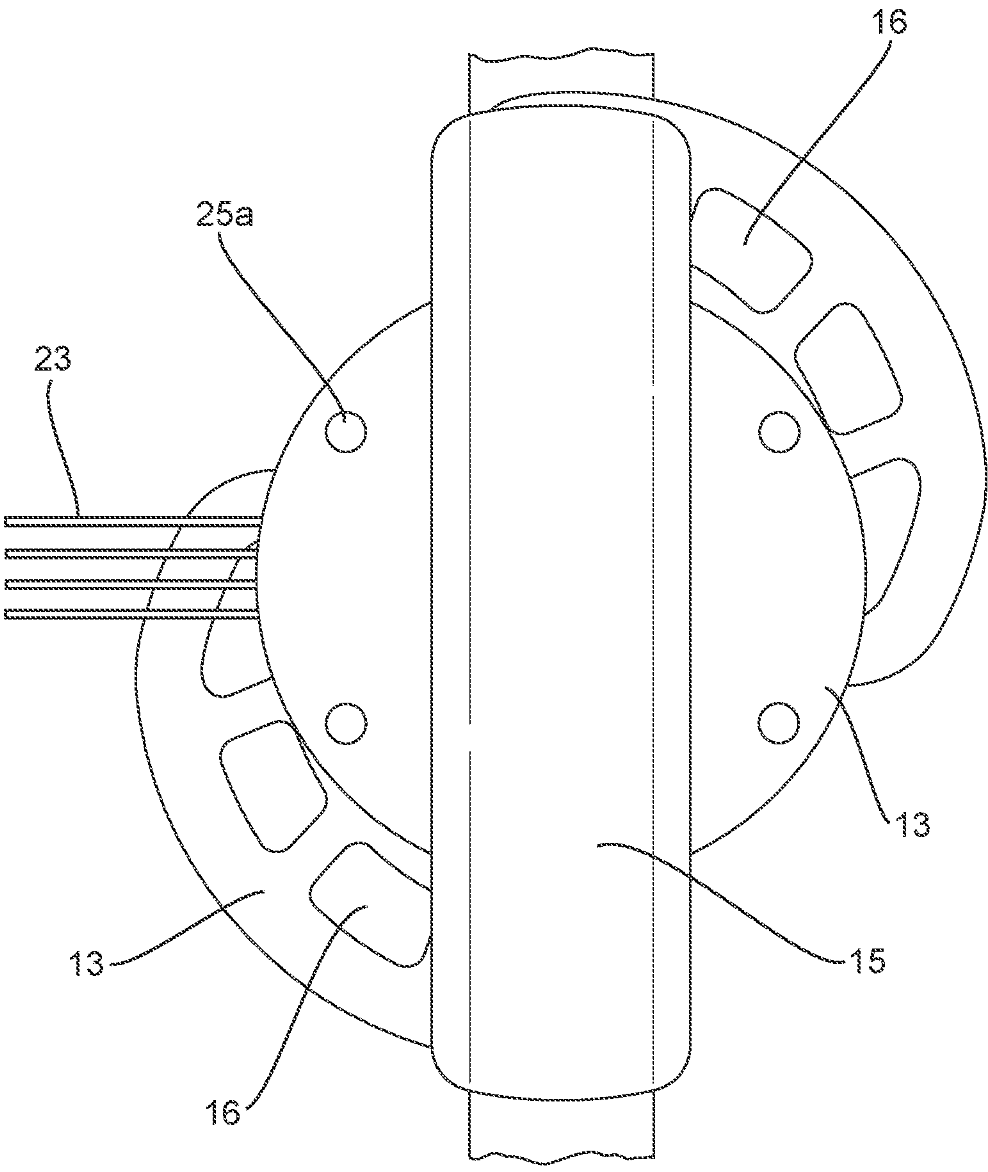
FIG. 9 shows a close-up front profile view of a part of the latching mechanism of FIG. 8.

FIG. 9 shows the handle 15, the rotatable plate 13 and the actuator 17 of the primary latch mechanism 9. Control wiring 23 connected to the actuator 17 is also shown in FIG. 9. The actuator defines four mounting holes 25*a*. Although not visible from the view of FIG. 9, it will be understood that corresponding mounting holes 25*b* are present on the rotatable plate such that the rotatable plate 13 and actuator 17 can be fixedly secured together with bolts/rods 26 passing through the mounting holes 25*a*, 25*b* on both the actuator 17 and the rotatable plate 13.

It will of course be understood that the provision of four mounting holes is purely exemplary and that any suitable number of mounting holes 25*a*, 25*b* may be provided. In this way, it can be ensured that rotational movement of the actuator 17 results in corresponding rotational movement of the rotatable plate 13. It will of course be understood that in embodiments, a gearing system may be used such that the angular rotation of the rotatable plate 13 is different to that of the actuator 17.

Figure 10:
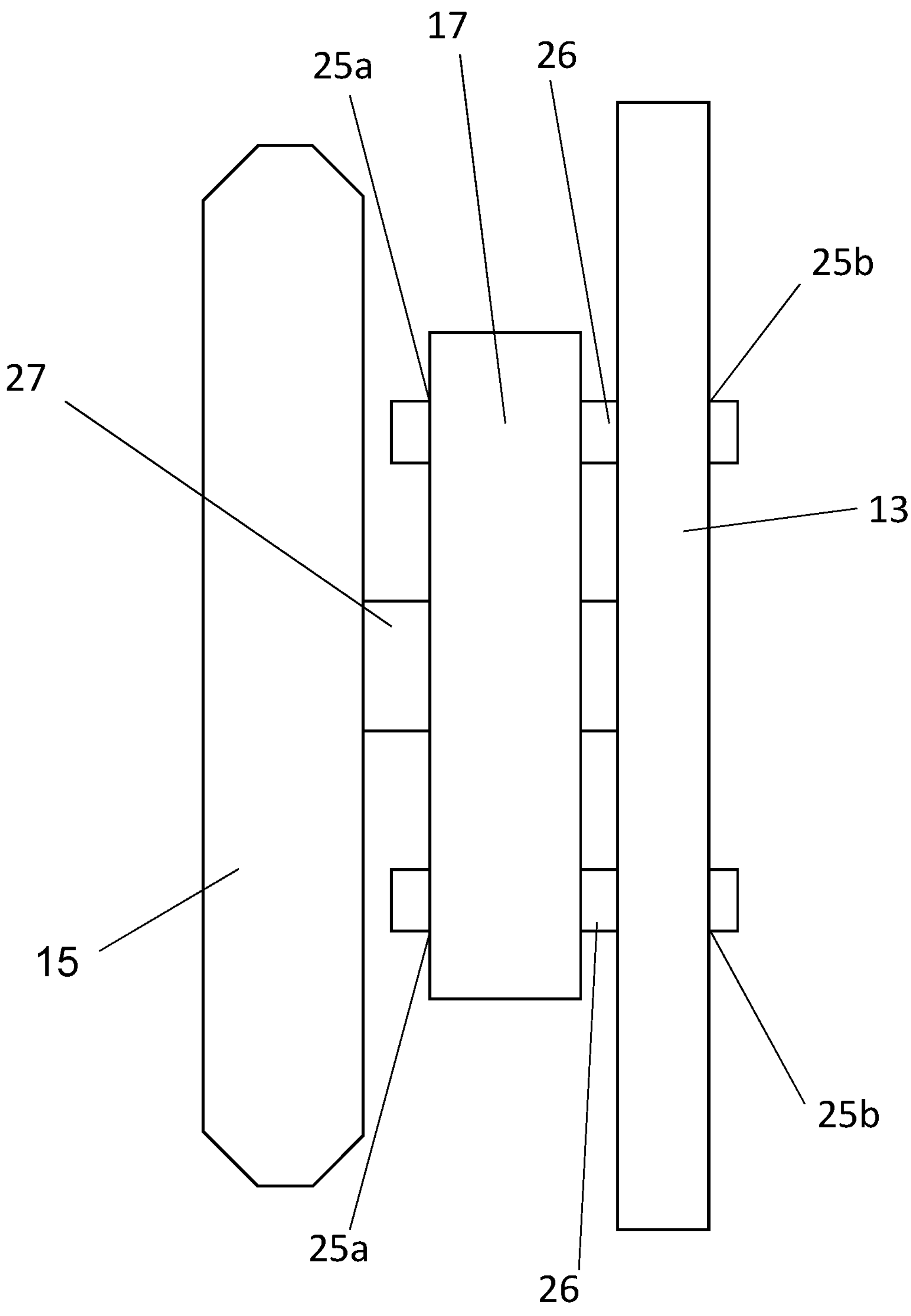
FIG. 10 shows a side profile view of the part of the latching mechanism shown in FIG. 9.

FIG. 10 shows the handle 15, the rotatable plate 13 and the actuator 17 of the primary latch mechanism 9 inside profile view. As discussed above in relation to FIG. 9, the rods 27 connect the rotatable plate 13 and the actuator 17 via the mounting holes 25*a*, 25*b*. A drive shaft 27 is fixedly connected to the handle 15, the rotatable plate 13 and the actuator 17, such that the handle 15 can be used to manually rotate the rotatable plate 13, for example in the event of an actuator failure, or in an emergency where a manual override may be necessary.

FIGS. 11*a*-*d* show a sensor assembly 30 during four different stages of the door being closed and then latched. The sensor assembly 30 comprises a first optical sensor 32 and a second optical sensor 34 as well as a sensor pin 35. The door frame 3 comprises a retainer 33 which defines the first latching hole 19*a*.

In FIG. 11*a*, the door assembly 5 is open and so the end piece 20 of the first latching rod 11*a* can be seen outside of the first latching hole 19*a*, resting against the retainer 33. The first sensor 32 is located in the door frame 3. It can be seen that at step a, neither the first sensor 32 nor the second sensor 34 will detect the first latching rod 11*a*.

In FIG. 11*b*, the door assembly 5 has been pushed. As such, due to the angle of the retainer 33, and the roller 21 reducing the friction between the end piece 20 of the first latching rod 11*a* and the retainer 33, the first latching rod 11*a* is pushed into the door body 7, and so it slides beneath the retainer 33.

In FIG. 11*c*, the first latching rod 11*a* is partially received within the first latching hole 19*a*, the biasing of the first latching rod 11*a* has urged the first latching rod 11*a* back out of the door body 7 such that the primary latch mechanism 9 is in the neutral position and the door body 7 is held closed by the first latching rod 11*a*. It can therefore be seen in FIG. 11*c* that the end piece 20 of the first latching rod 11*a* has crossed the first optical sensor 32 and so the sensor 32 will send a signal that the door is closed. However, since the first latch mechanism 9 has not yet been moved to the latched position, and thus the first latching rod 11*a* is not fully extended, the second optical sensor 34 has not yet detected the presence of the first latching rod 11*a*.

In FIG. 11*d*, the first latch mechanism 9 has been moved to the latched position and thus the first latching rod 11*a* is fully extended. As the first latching rod 11*a* extends, the roller 21 contacts the sensor pin 35 which is moveable towards the second optical sensor 34 in a direction perpendicular to that of the movement of the first latching rod 11*a*. The sensor pin 35 has a rounded head which is configured to contact the roller 21 and reduce resistance. As a result of the extension of the first latching rod 11*a* into the first latching hole 19*a*, the sensor pin 35 is displaced and crosses the second optical sensor 34. The second optical sensor 35 therefore detects the extended position of the first latching rod 11*a* in the first latching hole 19*a*, via the sensor pin 35. Therefore, at step d, the sensor assembly 30 can confirm that the door is both closed and latched.

In the illustrated embodiment, the sensors 32, 34 are optical sensors, but any sensor capable of determining the presence (or absence) of the first latching rod 11*a* and/or sensor pin 35 may be used.

Figure 12:
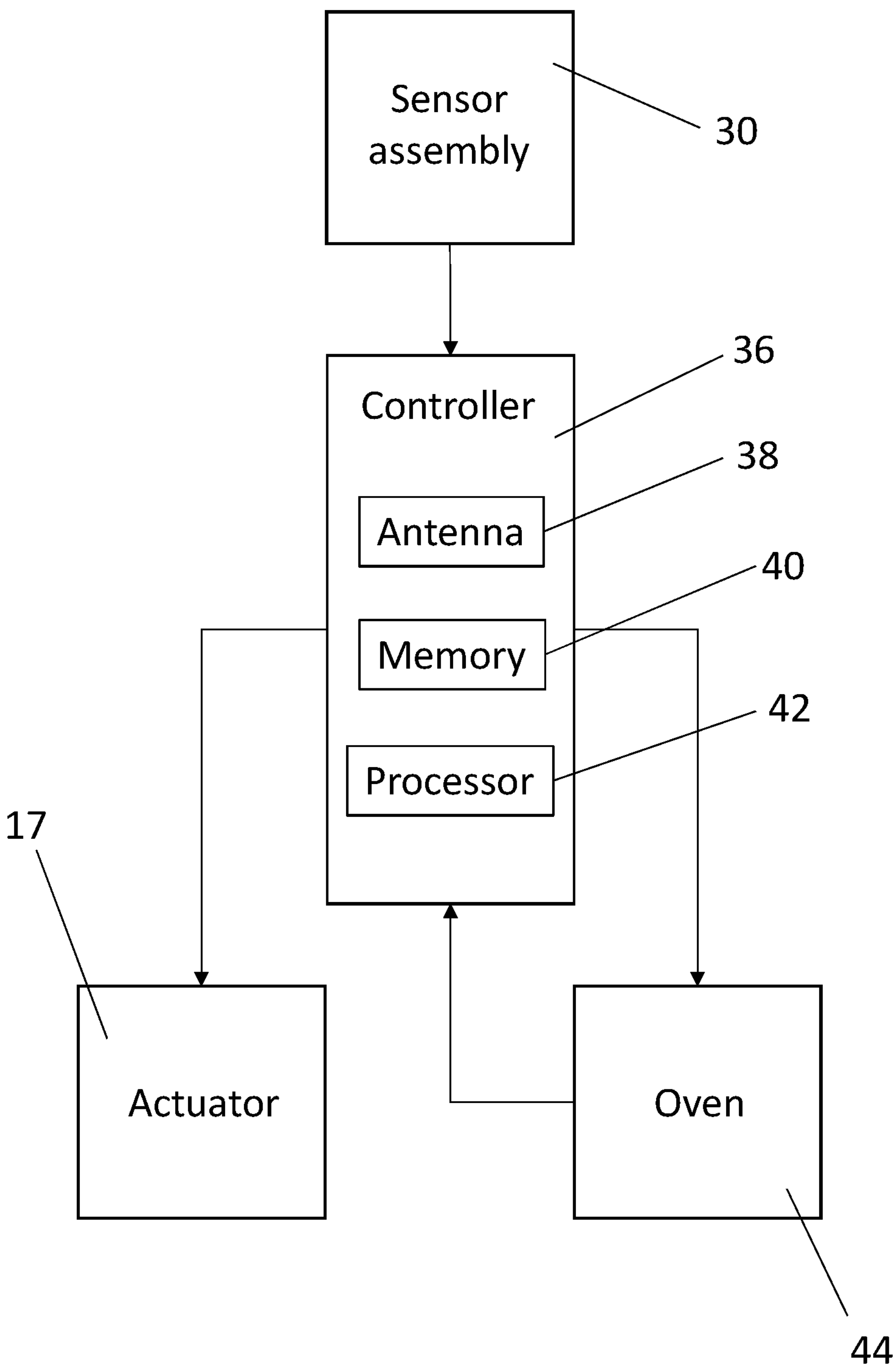
FIG. 12 shows a schematic block diagram of parts of a system in accordance with an embodiment of the invention.

FIG. 12 is a schematic block diagram showing parts of the system 1, according to an embodiment of the present invention, and their communication channels. The sensor assembly 30 is communicatively connected to a controller 36 which comprises an antenna 38, a memory 40 and a processor 42. Although it will be understood that the door assembly 5 of the present invention can be used for a plurality of purposes, in the illustrated example, the door assembly 5 is a galley oven door assembly fitted to a galley oven 44 in an aircraft.

The controller 36 is communicatively coupled to the oven 44 (e.g. to the oven control electronics) and is configured to both send and receive signals from the oven 44. In addition, the controller 36 is communicatively coupled to the actuator 17 and is configured to send signals to the actuator 17. It will be understood that the communication channels shown in FIG. 12 may be realized in any suitable way. For example, the components may be connected via wired connections, or via wireless connections such as Bluetooth, or via a network.

Figure 13:
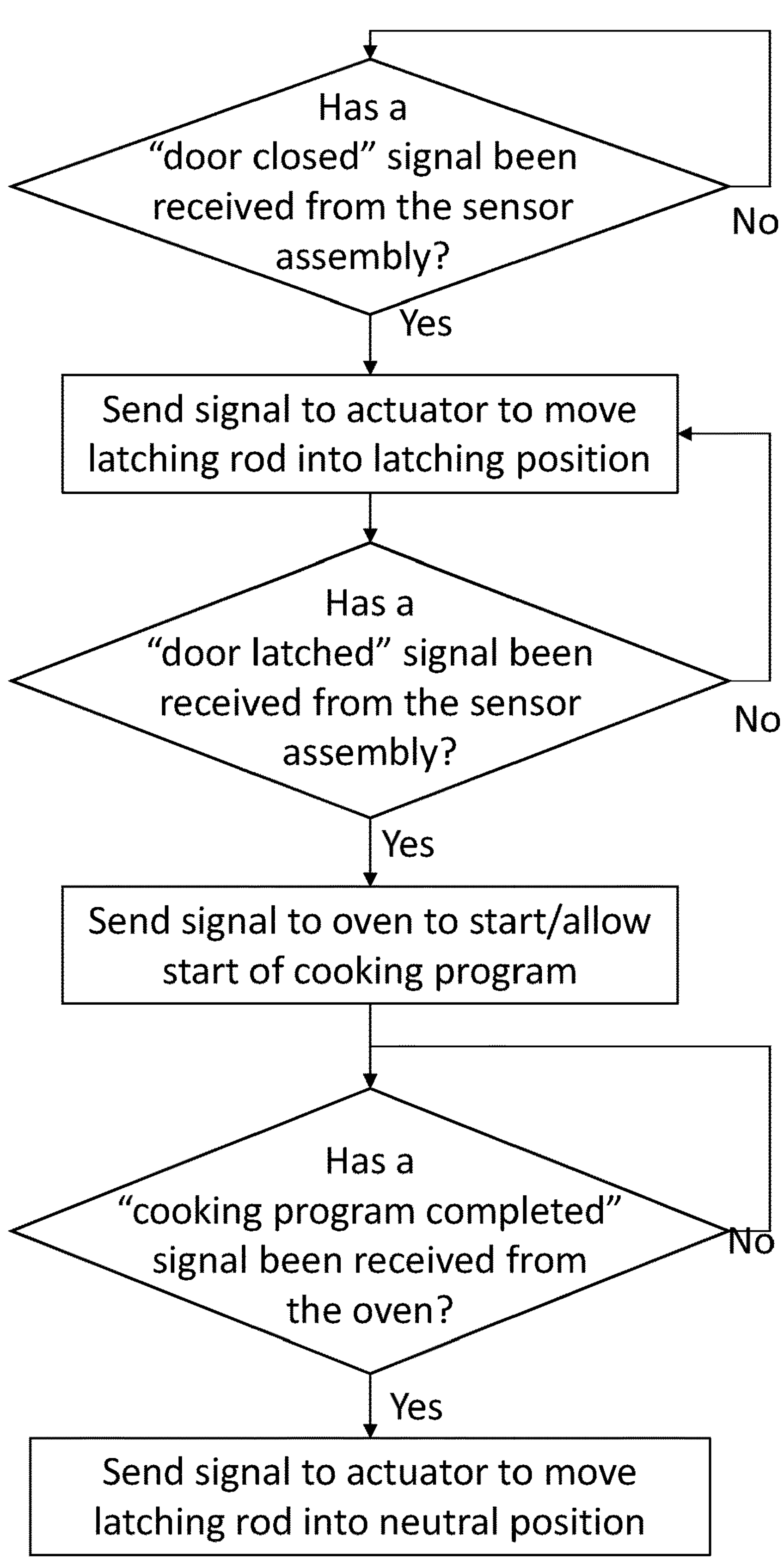
FIG. 13 is a flow chart illustrating a process followed by a controller in accordance with an embodiment of the invention.

FIG. 13 shows a flow chart illustrating the steps which are followed by the controller during operation of the system 1 according to an embodiment of the invention. Operation of the system 1 will be described with reference to FIG. 13, as well as FIGS. 1-12.

When a user closes the door body 7, the first and second latching rods 11*a*, 11*b* are compressed by the door frame 3, against the biasing of the compression springs 12*a*, 12*b* (a user may also turn the handle 14 to move the first and second latching rods 11*a*, 11*b* clear of the door frame 3). Owing to the biasing of the compression springs 12*a*, 12*b*, when the first and second latching rods 11*a*, 11*b* align with the latching holes 19*a*, 19*b*, the first and second latching rods 11*a*, 11*b* re-extend and so are received within the first and second latching holes 19*a*, 19*b*. The sensor assembly 30 detects the presence of the first latching rod 11*a* in the first latching hole 19*a*, and the sensor assembly 30 sends a signal to the controller 36 (e.g. via the antenna 38) that the door body 7 is closed.

At step 51, the controller 36 checks that a door closed signal has been received from the sensor assembly 30. If a door closed signal has been received then the controller 36 proceeds to step 53 and sends a control signal to the actuator 17 to move the first and second latching rods 11*a*, 11*b*, into the latching position.

In response to receiving a signal to move the latching rods into the latching position, the actuator 17 causes the rotatable plate 13 to rotate clockwise (it will be understood that the rotation may be anti-clockwise in other embodiments). This movement pushes the first and second latching rods 11*a*, 11*b* further into the latching holes 19*a*, 19*b*, latching the door body 7 closed.

Thus, a user can simply close the door (e.g. by slamming the door shut). In response to detecting that the door 7 is closed, the system will automatically latch the door securely, hence the ease of use is greatly improved for the user.

Further, when the door body 7 is latched, the advanced position of the first latching rod 11*a* is detected by the sensor assembly 30. In the illustrated embodiment, the door assembly 5 is fitted to an aircraft galley oven. As such, at step 55, the controller 36 checks that a "door latched" signal has been received from the sensor assembly 30. In response to receiving such a signal at step 57, the controller 36 can send a signal to the oven (e.g. send a signal to a separate oven controller) instructing the oven to begin a cooking program. In such embodiments, user convenience is greatly improved since a user can simply place an item to be cooked into the oven and close the door in the knowledge that the system 1 will automatically latch the oven door securely closed, and then begin a heating program with no further user input. Alternatively, step 57 can be used only as a safety feature, wherein it is still necessary for a user to begin a cooking program (e.g. by entering an input on a control panel) but the controller 36 will prevent the oven from beginning a cooking program until a "door latched" signal is received from the sensor assembly 30. Such an arrangement may be desirable where multiple cooking programs (e.g. cooking temperature, cooking time) are available, and so an automatic cooking program start is not appropriate.

At step 59, the controller 36 checks for a signal from the oven (e.g. a signal from a separate oven controller) that the cooking program has been completed. In response to receiving such a signal, at step 61, the controller 36 sends a control signal to the actuator 17 to move the first and second latching rods 11*a*, 11*b*, into the neutral position.

In response to receiving a signal to move the latching rods into the neutral position, the actuator 17 causes the rotatable plate 13 to rotate anti-clockwise (it will be understood that the rotation may be clockwise in other embodiments). This movement pulls the first and second latching rods 11*a*, 11*b* partially out of the latching holes 19*a*, 19*b*, un-latching the door body 7.

Thus, a user can simply open the door body 7 by pulling the handle, without having to manually un-latch it, hence the ease of use is greatly improved for the user.

In embodiments where a sensor pin is provided, a greater degree of freedom may exist regarding the location of the second sensor. E.g. because the second sensor is configured to detect the sensor pin, rather than the latching rod directly, the second sensor can be located more remotely from the latching rod.

In embodiments where the controller is configured to allow the oven to begin a heating program only in response to a signal that the door is closed and latched, the safety of the system is improved because the risk of a heating program being started before the door assembly is properly latched (potentially resulting in burns and/or heat leakage) is reduced.

In embodiments where the controller is configured to automatically control the oven to begin a heating program in response to receiving signals that the door is closed and latched, user convenience is improved since a user can simply place an item to be cooked into the oven and close the door in the knowledge that the system will automatically latch the oven door securely closed, and then begin a heating program with no further user input.

The system of the present disclosure may therefore automatically latch an aircraft galley door fully without any need for a user to manually operate any latching mechanism. Since the primary latching mechanism comprises a handle mechanically coupled to the rotatable plate, the door can still be latched manually, even in the event of an actuator failure.

It will therefore be seen that the system of the present disclosure has the potential to greatly increase the convenience of operating doors, particularly vehicle galley doors and aircraft galley oven doors by removing the necessity for a user to manually latch the door, which can be time consuming, particularly when a large plurality of doors are present.

What is claimed is:

1. A system comprising:

a door assembly configured to be installed within an aircraft galley, the door assembly comprising:

a door which is moveable between a closed position and an open position;

a primary latch mechanism configured to secure the door in the closed position, wherein the primary latch mechanism is moveable between a latched position, a neutral position and an unlatched position, wherein the primary latch mechanism comprises:

a rotatable plate;

an electrically operated actuator coupled to the rotatable plate and configured to rotate the rotatable plate;

a handle mechanically coupled to the rotatable plate and configured to rotate the rotatable plate; and a latching rod coupled to the rotatable plate, wherein the rotatable plate is configured to convert a rotational movement into linear movement of the latching rod such that the door may be latched and unlatched;

a door frame configured to at least partially receive the door assembly, wherein the door frame defines one or more holes configured to receive the latching rod when the primary latch mechanism is in the latched position; and a sensor assembly configured to determine whether or not the door is in the closed position and configured to detect a position of the latching rod within a hole of the one or more holes to determine whether the primary latch mechanism is in the latched position or the neutral position, wherein the sensor assembly comprises a first sensor configured to detect the position of the latching rod relative to the hole, and a second sensor configured to detect the position of the latching rod within the hole.

2. The system of claim 1, wherein at least a part of the sensor assembly is mounted in or proximal to one of the one or more holes, and wherein the sensor assembly is configured to produce data indicative of the position of the latching rod relative to the hole.

3. The system of claim 1, comprising a controller.

4. The system of claim 3, wherein the controller is communicatively coupled to the sensor assembly and the actuator, wherein the controller is configured to control the actuator to rotate the rotatable plate such that the primary latch mechanism is moved to the latching position in response to receiving a signal from the sensor assembly that the door is in the closed position.

5. The system of claim 1, wherein the door assembly is configured to be fitted to an aircraft galley oven, and wherein the controller is configured to allow the oven to begin a heating program only in response to receiving both a first signal from the sensor assembly indicating that the door is in the closed position, and a second signal from the sensor assembly that the primary latch mechanism is in the latched position.

6. The system of claim 5, wherein the controller is configured to automatically control the aircraft galley oven to begin the heating program in response to receiving both the first signal from the sensor assembly indicating that the door is in the closed position, and the second signal from the sensor assembly that the primary latch mechanism is in the latched position.

7. The system of claim 1, wherein the primary latch mechanism comprises a compression spring, coaxially arranged on the latching rod, wherein the compression spring is configured to bias the primary latch mechanism into the neutral position.

8. The system of claim 1, wherein the rotatable plate comprises a curved channel, and wherein the latching rod comprises a roller bearing, the roller bearing configured to travel in the curved channel when the rotatable plate is rotated.

9. The system of claim 1, wherein the latching rod comprises a roller located at a tip of the latching rod.

10. The system of claim 1, wherein the latching rod is a first latching rod, and wherein the system comprises a second latching rod.

11. The system of claim 1, further comprising a secondary latch mechanism configured to further secure the door in the closed position such that the door is still secure in an event of a failure of the primary latch mechanism.

* * * * *